J. G. MOOMY.
METHOD OF FORMING PATCHES FOR RUBBER ARTICLES.
APPLICATION FILED FEB. 21, 1913.
1,111,802.
Patented Sept. 29, 1914.
2 SHEETS—SHEET 1.
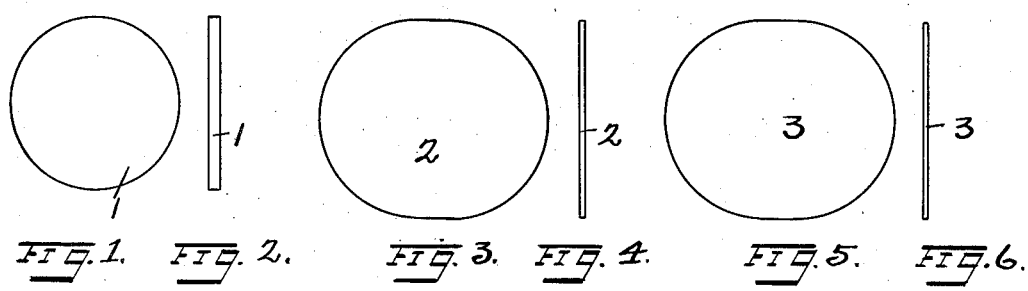
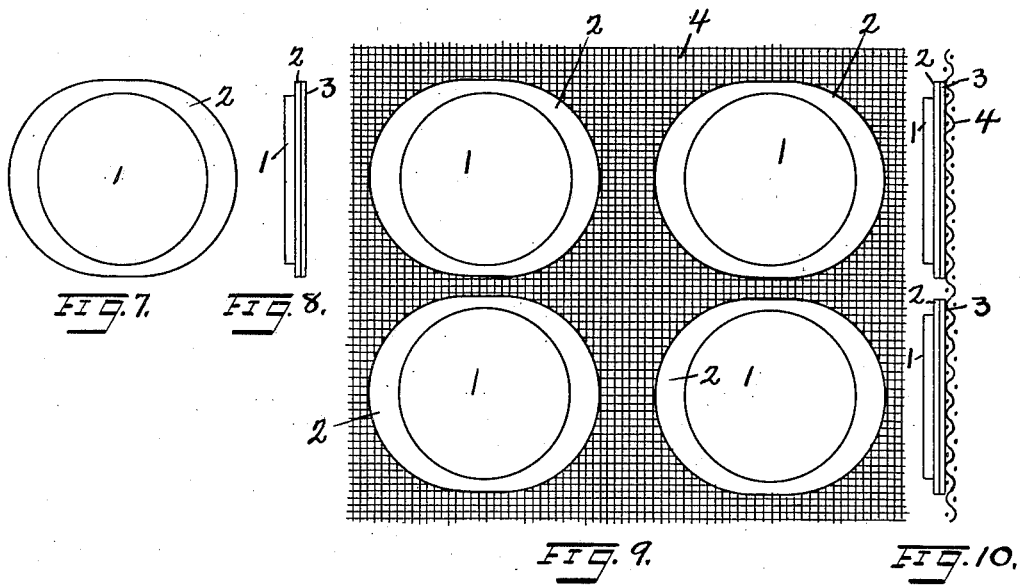
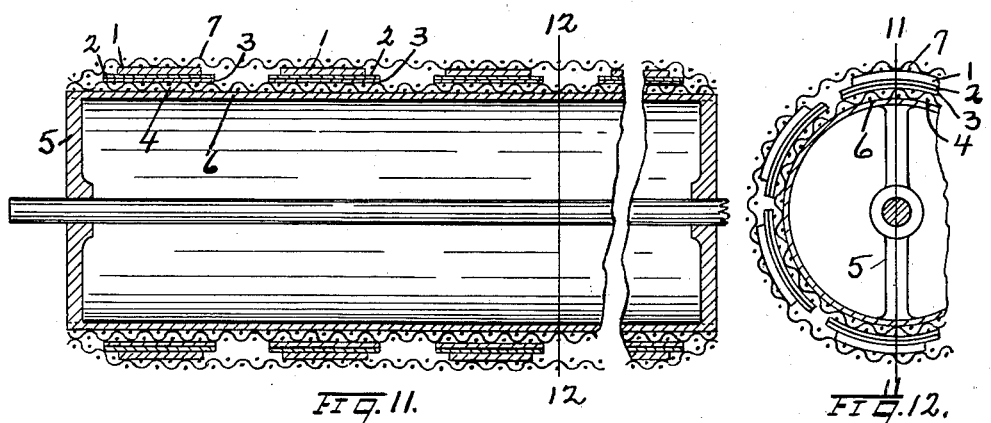
Witnesses
B. M. Hartman
M. Hornaman
Inventor
Joseph G. Moomy
by H. C. Lord
Attorney J. G. MOOMY.
METHOD OF FORMING PATCHES FOR RUBBER ARTICLES.
APPLICATION FILED FEB. 21, 1913.
1,111,802.
Patented Sept. 29, 1914.
2 SHEETS—SHEET 2.
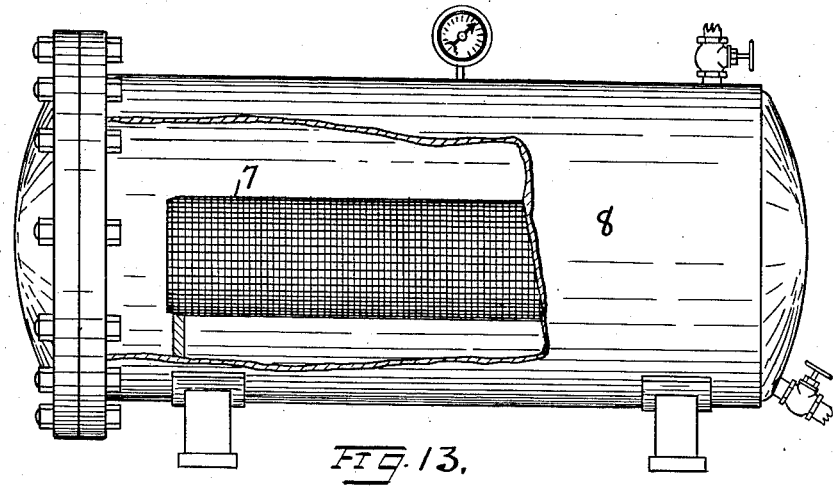
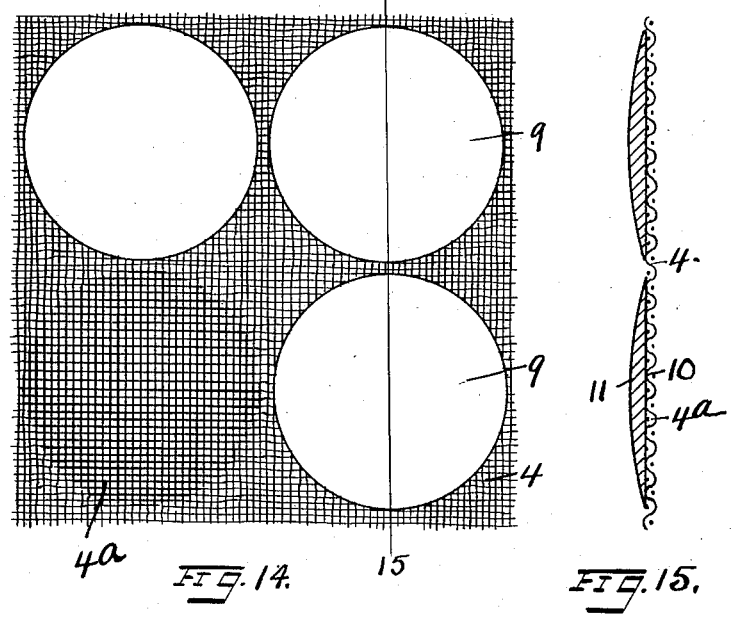 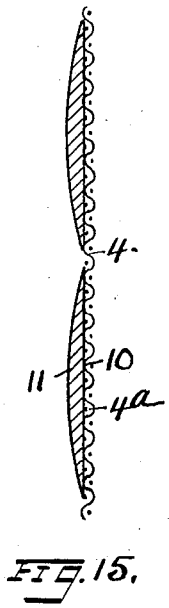
Witnesses
B. M. Hartman
M. Hornaman
Inventor
Joseph G. Moomy
by H. C. Lord
Attorney

UNITED STATES PATENT OFFICE.

JOSEPH G. MOOMY, OF ERIE, PENNSYLVANIA.

METHOD OF FORMING PATCHES FOR RUBBER ARTICLES.

1,111,802.   Specification of Letters Patent.   Patented Sept. 29, 1914.

Application filed February 21, 1913. Serial No. 749,844.

*To all whom it may concern:*

Be it known that I, JOSEPH G. MOOMY, a citizen of the United States, residing at Erie, in the county of Erie and State of Pennsylvania, have invented new and useful Improvements in the Method of Forming Patches for Rubber Articles, of which the following is a specification.

This invention relates to the method of forming patches for rubber articles and consists in certain improvements therein as will be hereinafter fully described and pointed out in the claims.

The object of the invention is to form patches having one surface vulcanized and the other surface raw rubber, the body of the patch forming a unitary mass varying in quality from the raw rubber of one surface to the vulcanized rubber of the opposite surface. The method further involves a convenient manner of mounting such patches.

The article formed by this process, or at least parts of this process forms the subject matter of another application filed March 26th, 1912, Serial Number 686,282.

The parts and apparatus involved in carrying out the process are illustrated in the accompanying drawings as follows:—

Figure 1 shows a plan view of the smaller layer of vulcanizing stock. Fig. 2 a side elevation of the same. Fig. 3 a plan view of a layer of vulcanizing stock. Fig. 4 a side elevation of the same. Fig. 5 a plan view of a layer of nonvulcanizing stock. Fig. 6 a side elevation of the same. Fig. 7 a plan view of these several layers associated. Fig. 8 a side elevation of the different layers placed together preparatory to vulcanizing. Fig. 9 a plan view of the patches mounted on muslin. Fig. 10 a side elevation of the parts as shown in Fig. 9. Fig. 11 a section on the line 11—11 in Fig. 12 of a drum on which the patches are placed for vulcanization. Fig. 12 a section on the line 12—12 in Fig. 11. Fig. 13 a vulcanizer, the shell being partly broken away to show the structure. Fig. 14 a plan view of the fabric 4, having the patches thereon after vulcanizing with one of the patches removed. Fig. 15 a section on the line 15—15 in Fig. 14.

The layers 1 and 2 are of vulcanizing stock, that is, the rubber is combined with material which will effect vulcanization under heat. The object in forming the layer 1 of smaller dimensions than the layer 2 is to give to the finished product a beveled edge. The layer 3 is of nonvulcanizing stock. After the different layers are associated as in Fig. 8 they are placed on a fabric 4 as shown in Fig. 9. This fabric is preferably glazed fabric, ordinarily glazed muslin. Fig. 10 shows a side elevation of the parts shown in Fig. 9. After the patches are placed on the muslin 4 they are wrapped on a drum 5, said drum having an imperforate surface 6, ordinarily galvanized iron. The patches are put under pressure by winding a muslin strip 7 around the drum and over the patches. The drum having the muslin with the patches mounted on it is then placed in the vulcanizing heater as shown in Fig. 13, and steam is turned into the vulcanizer in the ordinary manner. If a glazed fabric 4 is used and this is put on a drum having an imperforate surface 6, the glazed fabric in connection with the surface and the superimposed patch being vulcanized forms a seal which excludes the moisture from that part of the muslin between the raw patch and the imperforate surface. The result is that the nonvulcanizing stock does not penetrate the muslin sufficiently to prevent its ready removal from the muslin.

In Fig. 14 I have shown a part of the muslin 4ª which has thus been sealed from the moisture and this retains the glazed surface which permits of the ready removal of the patch. In the exposed parts of the muslin the glaze is removed through the action of the steam in the vulcanizing process.

In the vulcanizing process the layer 1 of vulcanizing stock and the edges of the layer 2 under the influence of the wrapping of muslin forms a beveled surface such as shown in Fig. 15.

What I claim as new is:—

1. The method of forming patches for rubber articles which consists in forming a layer of raw rubber and a layer of stock compounded to vulcanize under heat; placing said layers together face to face; and vulcanizing and uniting the associated layers by heat to form a patch, having one surface vulcanized rubber and the other surface raw rubber.

2. The method of forming patches for rubber articles which consists in forming a layer of raw rubber a layer of stock compounded to vulcanize under heat and approximating the size of the layer of raw rubber, and a second layer of stock compounded to vulcanize under heat arranged on the first layer of vulcanizing stock, said second layer being of smaller dimensions than the first layer; placing the three layers together face to face with the two layers of vulcanizing stock in contact and the layer of raw rubber on the larger layer of vulcanizing stock; and vulcanizing and uniting the associated layers by heat while subjecting the layers to pressure and causing the edge to flow to form a patch with beveled edge and having one surface vulcanized rubber and the other surface raw rubber.

3. The method of forming patches for rubber articles which consists in forming a layer of raw rubber and a layer of stock compounded to vulcanize under heat; placing said layers together face to face; placing the exposed surface of the layer of raw rubber on a glazed fabric; placing the glazed fabric on an imperforate surface; and vulcanizing and uniting the associated layers by heat to form a patch having one surface vulcanized rubber and the other surface raw rubber, the surface of the raw rubber remaining detachably secured to the glazed fabric.

In testimony whereof I have hereunto set my hand in the presence of two subscribing witnesses.

JOSEPH G. MOOMY.

Witnesses:
B. M. HARTMAN,
THOMAS C. MILLER.